May 26, 1931.          J. L. MYERS          1,807,166
GROOVED BEARING
Original Filed May 9, 1923   3 Sheets-Sheet 1

INVENTOR.
James L. Myers.
BY
Fay, Oberlin & Fay
ATTORNEYS.

May 26, 1931. J. L. MYERS 1,807,166
GROOVED BEARING
Original Filed May 9, 1923   3 Sheets-Sheet 2
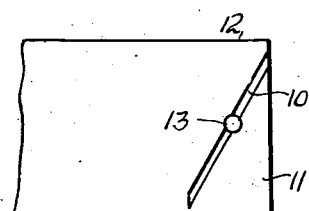
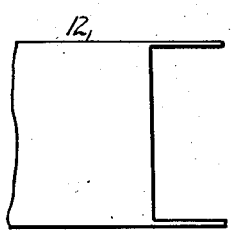
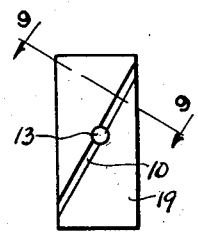
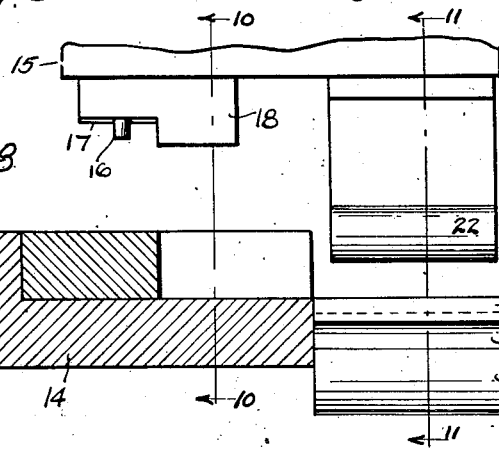
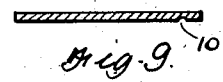
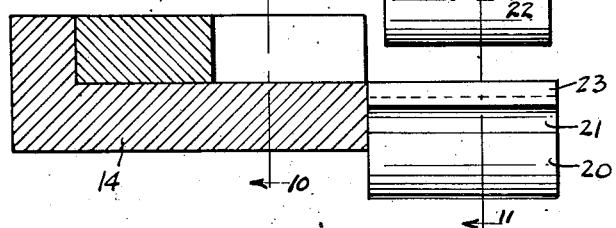
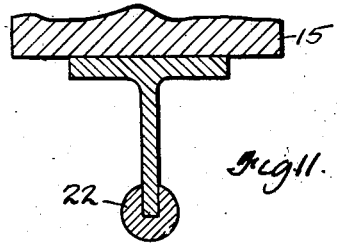
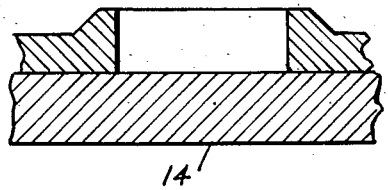
INVENTOR.
James L. Myers
BY
Fay, Oberlin & Fay
ATTORNEYS.

May 26, 1931.　　　　J. L. MYERS　　　　1,807,166
GROOVED BEARING
Original Filed May 9, 1923　　3 Sheets-Sheet 3

INVENTOR.
James L. Myers
BY
Fay, Oberlin & Fay
ATTORNEYS.

Patented May 26, 1931

1,807,166

UNITED STATES PATENT OFFICE

JAMES L. MYERS, OF CLEVELAND HEIGHTS, OHIO, ASSIGNOR TO THE CLEVELAND GRAPHITE BRONZE COMPANY, OF CLEVELAND, OHIO, A CORPORATION OF OHIO

GROOVED BEARING

Original application filed May 9, 1923, Serial No. 637,818. Divided and this application filed October 27, 1924. Serial No. 745,984.

The present invention relates to an improved bearing formed of rolled, hardened sheet metal and provided with a lubricant groove formed in the operating surface of the bearing. The principal object of the present invention is the provision of a bearing of the split rolled sheet metal type provided with a lubricant-receiving groove of various types in the operating surface, the groove being formed in the bearing during its process of manufacture, and in this way avoiding any operations subsequent to the forming of the sheet metal into cylindrical shape, and thus avoiding machining the surface of the bearing. To the accomplishment of the foregoing and related ends, said invention, then, consists of the means hereinafter fully described and particularly pointed out in the claims.

The annexed drawings and the following description set forth in detail certain mechanism embodying the invention, such disclosed means constituting, however, but one of various mechanical forms in which the principle of the invention may be used.

In said annexed drawings:—

Figure 1:
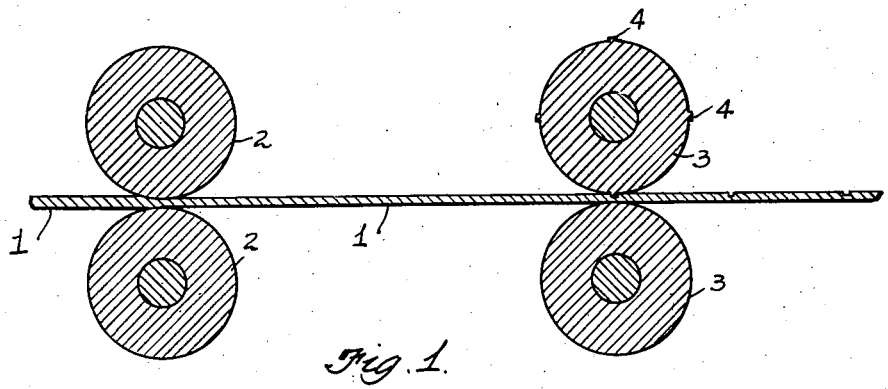
Figure 2:
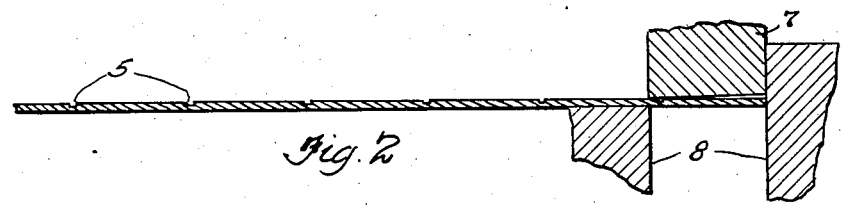
Figure 3:
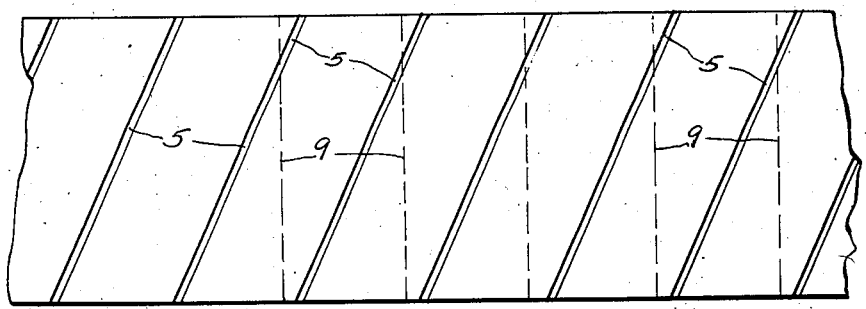
Figure 4:
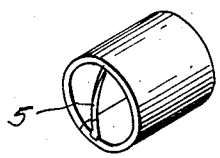
Figure 13:
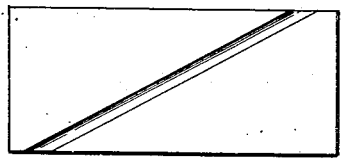

Fig. 1 shows a view in longitudinal section of apparatus for rolling a certain type of groove in a strip of metal designed to be formed in a bearing; Fig. 2 is a similar view showing the blanking means for severing the strip into sheets of the proper size for circling in bearings; Fig. 3 is a plan view of the strip after the formation of the grooves; Fig. 4 is a view in perspective of the finished bearing; Fig. 5 is a plan view showing the strip in which has been formed a groove slightly different from that shown in Fig. 3; Fig. 6 is a view of the strip after the blanking operation; Fig. 7 is a plan view of the blank cut from the strip; Fig. 8 is a longitudinal section through a combined grooving and blanking punch and the complementary dies and also the first forming punches or dies; Fig. 9 is a section on the line 9—9 in Fig. 7; Fig. 10 is a section on the line 10—10 of Fig. 8 through the blanking dies; Fig. 11 is a section on the line 11—11 Fig. 8 showing the first forming dies; Fig. 12 is a transverse section of the blank after the completion of the first forming operation; and Figs. 13 to 18, inclusive, are plan views of various blanks showing different types of lubricating grooves formed therein.

Referring now to Figs. 1, 2, 3 and 4 I have shown a strip 1 of rolled sheet metal possessing bearing qualities, such for example as brass or the like, which is first passed through sizing rolls 2, and then through grooving dies or rolls 3. One of the rolls 3 is provided with a series of projections 4 designed to produce diagonally extending grooves 5 in one surface of the strip 1. These grooves serve to convey oil or other lubricant from end to end of the finished bearing and to distribute the same over the shaft or pin which is journaled therein.

After the strip 1 is passed through the grooving rolls 3 it is passed into a blank punch consisting of a reciprocating die 7 and stationary dies 8, and blanks are in this way cut from the strip, the shape and size of the blank being indicated in Fig. 3 by the dotted lines 9. Certain types of grooves, such, for example, as those shown in Figs. 3 and 13, in which the groove extends from edge to edge of the original strip, may readily be formed by rolls, as indicated in Fig. 1, while other types of grooves shown in Figs. 14 to 18, inclusive, can more conveniently and economically be produced by means of reciprocating dies, which are shown in Figs. 8 to 11, inclusive.

In Fig. 5 there is shown a diagonally extending lubricant groove 10 in a strip 11, the groove terminating short of the sides or edges 12 of the strip 11, and having a lubricant carrying aperture 13 formed at some point, and passing entirely through the strip. Such an oil groove may be formed by means of the reciprocating dies shown in Figs. 8, 10 and 11. In Fig. 8 there is shown a stationary die 14 and a reciprocating die 15, the latter being provided with a cylindrical projection 16 adapted to form the oil hole 13 in the strip, and with a projection 17 extending from either side of the projection 16 and adapted to form the oil groove. This groove-forming die is combined with a blanking die 18, which is shown in transverse section in Fig. 10, and which cuts the blank 19, shown in Fig. 7, from the strip 12, leaving the latter in the condition indicated in Fig. 6. There is also combined with the grooving and blanking die, a forming device consisting of two complementary oscillatory cylinders 20, which are provided with circularly shaped recesses 21, and they are adapted to be oscillated by the downward movement of a cylindrical plunger 22. As the blank leaves the blanking die 18 and is fed forward into a slot 23 in the member 24, which carries the dies 20, the plunger 22 is brought down and bends or folds the blank into the shape shown in Fig. 12 against the complementary oscillating members 20, after which the partially formed bearing is discharged from this die and is then finished and formed into true cylindrical shape by any suitable means.

Figure 14:
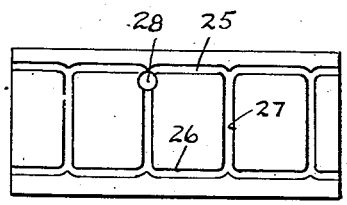
Figure 15:
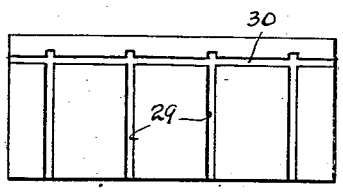
Figure 16:
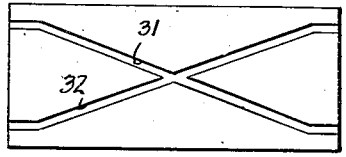
Figure 17:
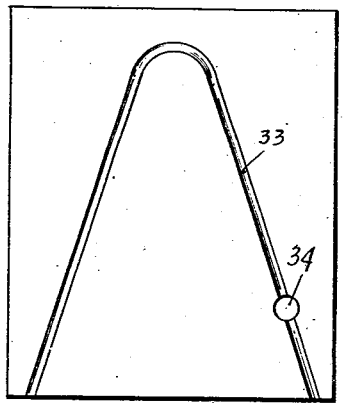
Figure 18:
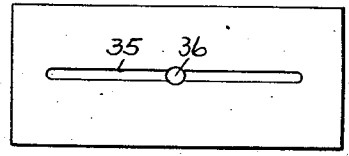

In Figs. 14 to 18, inclusive, I have shown various types of lubricating grooves, that of Fig. 14 consisting of two parallel grooves 25 and 26, connected by transverse grooves 27 with a supply opening through the bearing at the intersection of one of the transverse grooves and one of the two parallel grooves. In Fig. 15 a series of transverse grooves 29 are shown intersecting a longitudinal groove 30, and it should be remembered that the groove 30, shown as the longitudinal groove in the blank, becomes an encircling or circumferential groove in the finished bearing. In Fig. 16 I have shown two crossed grooves 31 and 32, which, in the finished bearing, will form a figure 8, while in Fig. 17 there is a single groove 33 and lubricant supply hole 34, the groove extending to the edges of the finished bearing on one side only. In Fig. 18 there is shown a circumferential groove 35 and supply opening 36, but the groove 35 does not extend completely around the interior of the finished bearing.

The advantages of the present bearings are their low cost of manufacture and the very much better distribution of lubricant which can be secured by reason of the shapes and forms of grooves which can be produced by the present method over those which are possible by machine or finished bushings, which is the method now in general use in producing lubricant grooves. The lubricant grooves produced by the present method add but very little to the cost of the bearing, and can be given practically any desired shape to insure proper distribution of the lubricant under various conditions.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. A split cylindrical sheet metal bearing having a cold pressed liquid lubricant distributing groove formed in the bearing surface thereof, the area of said groove constituting but a very small fraction of the total area of said bearing, and said groove being spaced at all points a material distance from the ends of said bearing.

2. A split cylindrical sheet metal bearing having a cold pressed liquid lubricant distributing groove formed in the bearing surface thereof, said groove being arranged to register across the split in said bearing and said groove being spaced a sufficient distance from the ends of said bearing to prevent leakage of lubricant from said bearing and an opening through said bearing for the entrance of lubricant.

Signed by me, this 24th day of October, 1924.

JAMES L. MYERS.